United States Patent [19]

Jackson et al.

[11] 4,219,413

[45] Aug. 26, 1980

[54] METHOD AND APPARATUS FOR TREATING WATER

[75] Inventors: Stephen Jackson, Oadby; Geoffrey A. Roulstone, Loughborough, both of England

[73] Assignee: Fisons Limited, London, England

[21] Appl. No.: 900,152

[22] Filed: Apr. 26, 1978

[30] Foreign Application Priority Data

May 3, 1977 [GB] United Kingdom ............ 18391/77

[51] Int. Cl.² .................................................. C02B 1/76
[52] U.S. Cl. ..................................... 210/25; 210/96.1; 210/143; 210/191
[58] Field of Search ................ 137/209, 212; 210/25, 210/30 R, 34, 86, 90, 96 R, 97, 103–105, 190, 191, 257 R, 269, 143

[56] References Cited

U.S. PATENT DOCUMENTS

| | | | |
|---|---|---|---|
| 2,209,487 | 7/1940 | Wagner | 210/190 |
| 2,938,868 | 5/1960 | Carlson et al. | 210/25 |
| 3,366,241 | 1/1968 | McMorris | 210/190 |
| 3,696,830 | 10/1972 | Janu | 137/209 |
| 3,799,344 | 3/1974 | Nishizawa | 210/104 |

Primary Examiner—Ivars C. Cintins
Attorney, Agent, or Firm—Merriam, Marshall & Bicknell

[57] ABSTRACT

Method and apparatus for treating water with a regeneratable material (e.g. an ion exchange resin) in which the regenerating reagents are fed to the material by pneumatic means. Preferably, the reagent is diluted in a small multi-fill dilution tank feeding the container(s) for the water treatment material.

8 Claims, 4 Drawing Figures

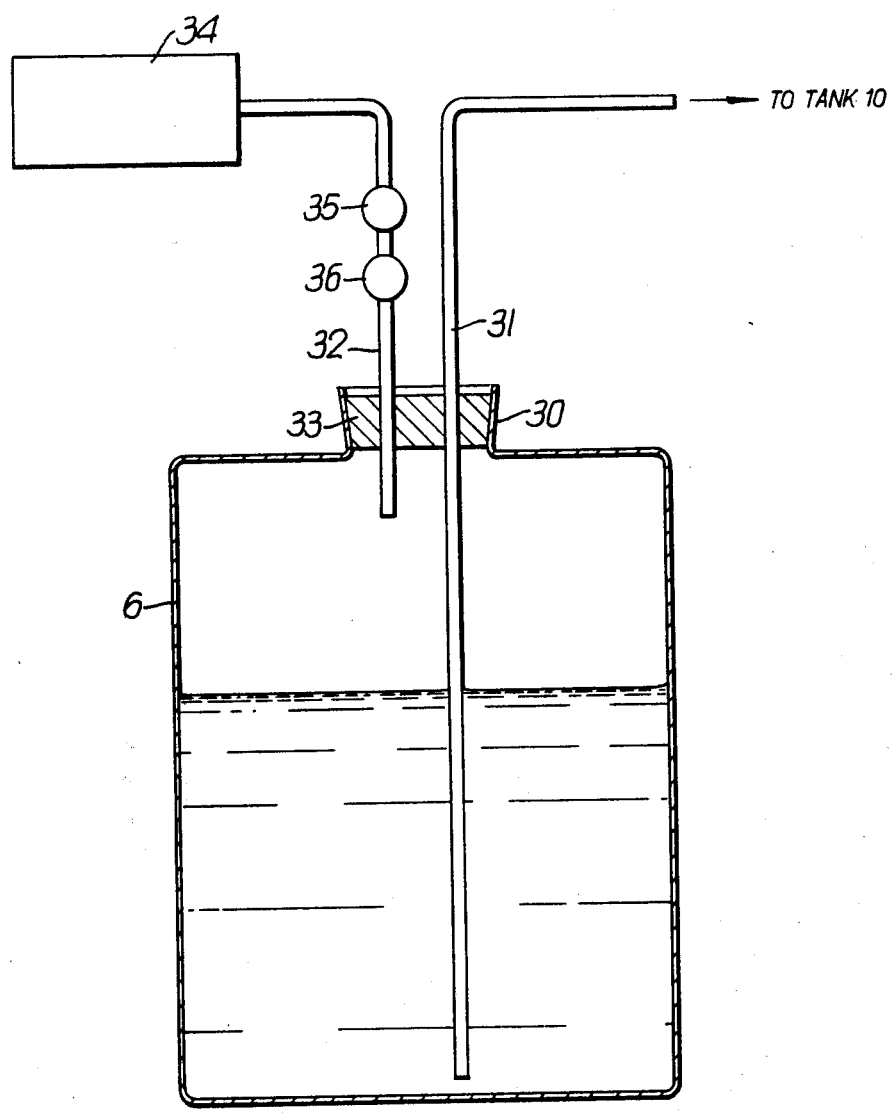

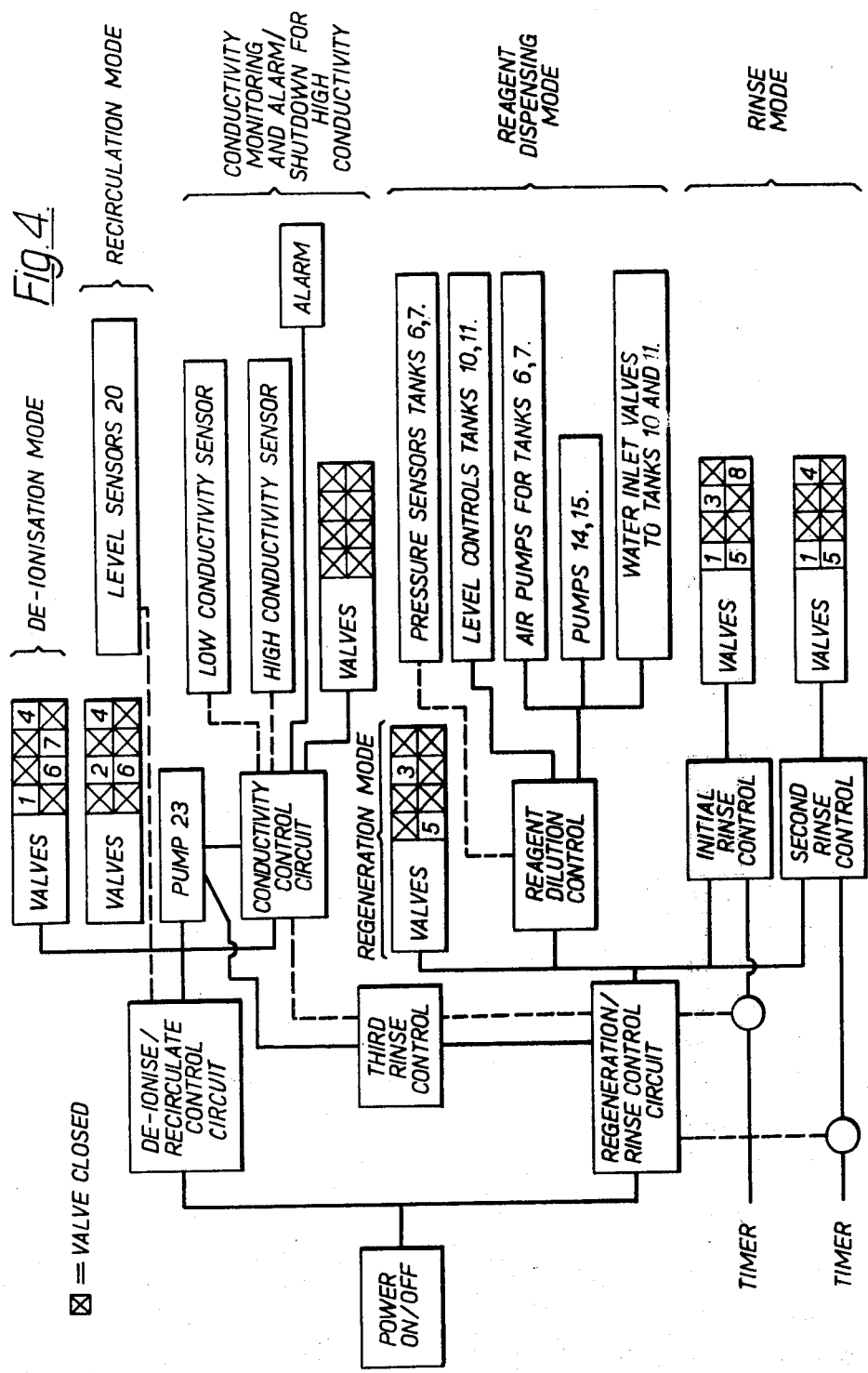

METHOD AND APPARATUS FOR TREATING WATER

The present invention relates to a method and a device, notably an automated device for the treatment of water.

Water is treated in a number of ways to remove ionic materials therefrom. In general these treatments involve passing water through one or more columns containing ion exchange resins. However, after a time the resins lose their efficacy and it is necessary to regenerate the resins by passing an acid and/or an alkali through them. This has hitherto been done manually with attendant risk of human errors, accidents and spillages of corrosive and dangerous materials.

We have now devised a form of device which reduces the above problems.

For convenience and to aid under standing of the invention, a preferred form of the device will be described by way of illustration with respect to the accompanying drawings, in which:

FIG. 3 is a diagrammatic section through a dispensing system for use in the device of FIG. 1; and FIG. 4 is a block diagram of the electrical circuit used in the device of FIG. 2.

Figure 1:
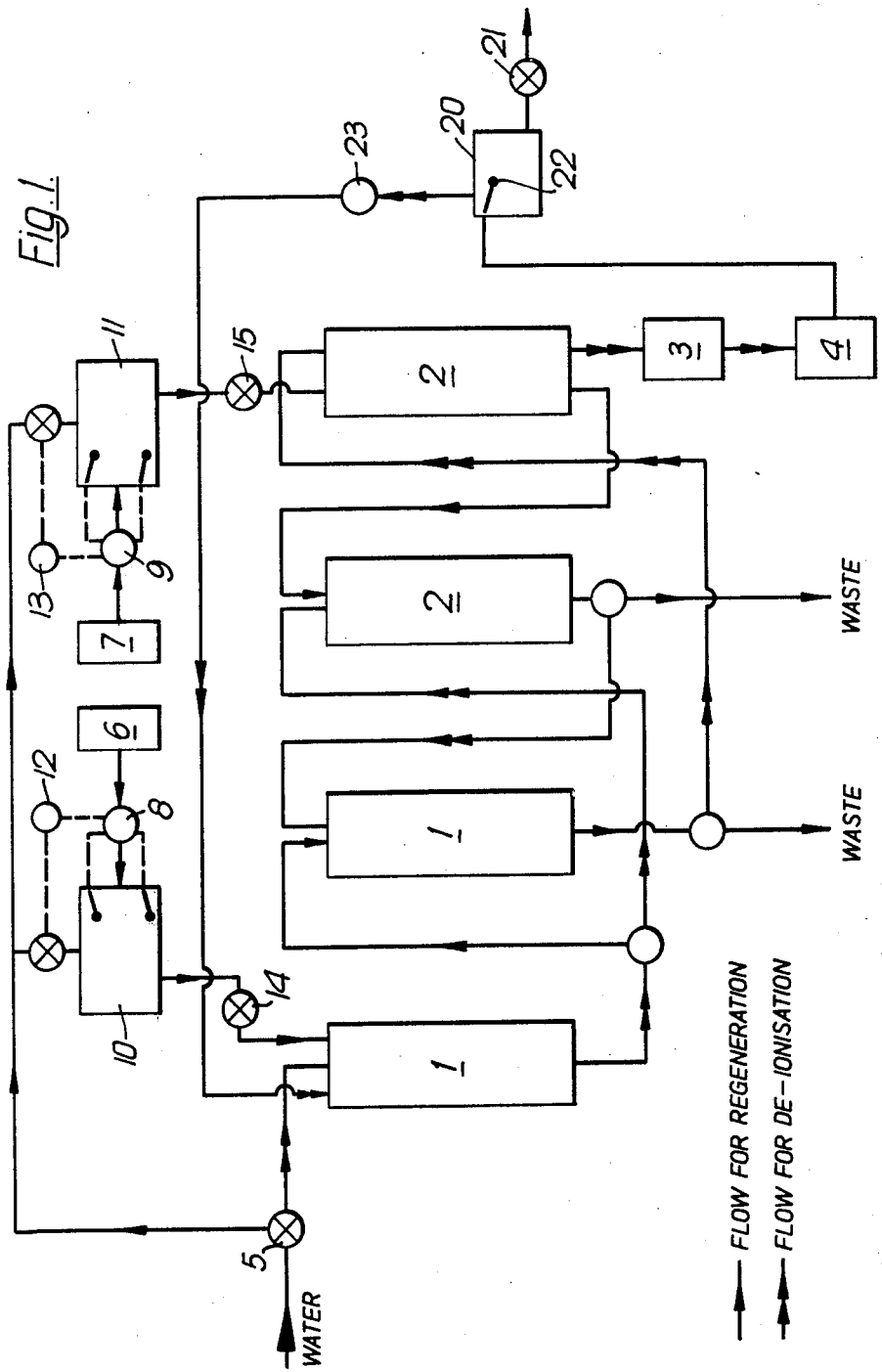
FIG. 1 is a block diagram of the device.

The device comprises two columns or pairs of columns (1 and 2) containing ion exchange resin. In column(s) 1 is a cationic exchange resin and in column(s) 2 is an anionic exchange resin or vice versa. Water is fed from a supply, e.g. the mains, to pass through column(s) 1 and column(s) 2 alternately to provide a stream of deionised water. If desired, the deionised water may thereafter be passed to a mixed cation/anion exchange resin column 3 to treat the water yet further. The columns 1 and 2 are typically upright cylindrical vessels of the appropriate capacity containing commercially available resins, notably gel type resins.

The quality of the deionised water is monitored before it leaves the device. Conveniently, this is done by measuring the conductivity of the water using a conventional conductivity cell 4. As the efficacy of the resins in columns 1 and 2 drops, so the conductivity of the water rises. When it reaches a given level above which the water quality is no longer acceptable, the conductivity cell shuts off the flow of water to the device via valve 5, and either trips an alarm that the regeneration cycle should be started manually, or it initiates the resin regeneration cycle.

In the regeneration cycle, the flow of water to be treated is shut off at valve 5, acid is passed through column(s) 1 and alkali is passed through column(s) 2 to regenerate the resins therein. The effluent from the columns is preferably combined to provide a substantially neutral effluent for discharge to waste and measures are provided to dilute the acid and alkali for use and safety interlocks are provided.

Reservoirs of concentrated acid (6) and alkali (7) are provided with pump means 8 and 9 for drawing reagent at a given rate from the reservoirs. The pump means is a novel pneumatic pump which offers the advantages of reduced cost and greater simplicity and reduces contact between the corrosive acid or alkali and the moving parts of the pump. The pumps 8 and 9 will be described in greater detail below. The pumps 8 and 9 deliver acid and alkali respectively to storage/dilution tanks 10 and 11. Water from, for example, the mains is also fed to tanks 10 and 11 to cause dilution of the reagents to the desired level. The dilution level is achieved by delivering a given volume of the reagent to its tank using a time switch 12 or 13 acting on each of pumps 8 and 9. Water is fed to the tanks 10 and 11 in response to a level sensing switch which actuates valves in the water supply lines to each tank. These valves are interlocked with the timer mechanisms on pumps 8 and 9 so that water is fed to tank 10 or 11 when a measured dose of acid or alkali is being or has been fed to the tank. It is preferred that tanks 10 and 11 be vented to atmosphere to avoid pressure build up.

When the tanks 10 and 11 have been charged, the reagent and water supplies are switched off and diluted acid and alkali are then passed through the appropriate columns, e.g. by pump or valve means 14 and 15. The outlet of each column is provided with suitable valve means whereby the reagent is passed either to waste or to a similar column in the series of columns rather than to a column being treated with the other reagent. Conveniently the flow of water and reagent through the columns is controlled by a series of interlinked solenoid valves.

In practice it will usually be necessary to pass a larger volume of acid and/or alkali through the columns than can be held in tank 10 or 11. When either tank is emptied, a low level sensor in that tank is actuated to replenish the reagent in that tank. Preferably the sensor also shuts off the flow of reagent from the other tank until the empty tank has been replenished with diluent and reagent. Once the tank is refilled, flow of both reagents through the columns is restarted. In this way both reagents flow through the columns and to waste concurrently, resulting in a substantially neutral waste. The use of tanks 10 and 11 to deliver batches of diluted reagent enables one to achieve lower ratios of dilution of the reagent with water (e.g. 1:1, 1:2 or 1:3) than is feasible with on line continuous mixer/d diluters, such as a venturi mixer. Also by using several refills of each tank 10 or 11 it is possible to use comparatively small tanks rather than a large tank to hold all the diluted reagent required.

The flow of reagent from the tanks 10 and 11 is preferably set so that the required volume of diluted acid reagent to regenerate the cationic resin is discharged in the same time as the required volume of alkali. Whilst the required volume flow may be monitored by suitable flow measurement or timing means, we prefer that the reservoirs 6 and 7 hold only sufficient reagent for one regeneration of the cells. Completion of the regeneration cycle is then conveniently determined by monitoring the contents of the reservoirs. This may be done by mounting the reservoirs on weight sensors which cut out when the given weight of reagent has been drawn out or by other means, e.g. level sensors. However, with the pneumatic dosing pump system, the loss of back pressure in the reservoir indicates when the reagent has been consumed. If desired, the control system for the device can be set so that the tanks 10 and 11 are rinsed out with water as a final step of the regeneration stage.

When regeneration has been completed, either an alarm signal is actuated or the device switches automatically to the rinse stage. In this stage the feed of reagent from tanks 10 and 11 ceases and valve 5 opens to permit water to flow through the columns to waste. Preferably an initial rinse is carried out with water flowing in parallel through the columns 1 and 2. This initial rinse is continued either for a given time or until a given quantity of rinse water has flowed, dependant upon the recommendations for the particular resin used. After the initial rinse, which removes most of the acid and alkali residues from the resins, the device operates a second rinsing stage in which it switches to the water deionising mode where water flows through the columns in series for a period of time with the water being discharged to waste. After a time the conductivity of the effluent water is monitored. During rinsing, the conductivity drops as the last residues of acid and alkali are stripped from the resin. When the conductivity drops to an acceptable level, the rinse stage is halted and the flow of water from the columns is fed to a tank 20. The device then shuts down and emits a signal that it is ready to dispense treated water again. If desired the second rinsing stage is followed by a stage where the rinse water from the columns is fed to tank 20. Pump 23 then recycles the water to the columns. In this way the rinse water is reused until the water passing through tank 20 reaches the desired quality.

A preferred form of the pneumatic system for dispensing the reagents from the reservoirs 6 and 7 is shown diagrammatically in FIG. 3 of the accompanying drawings.

The system comprises a reservoir for reagent (in this case the acid reservoir 6) which takes the form of a replaceable or refillable vessel. For convenience reservoir 6 is provided by the Winchester or other flask in which the reagent is usually supplied. Alternatively, reservoir 6 could take the form of a plastic or similar tank which can be refilled with the desired quantity of reagent. The reservoir 6 has an outlet 30 at its top, e.g. the neck of the Winchester. Through the outlet 30 are passed a dip tube 31 which reaches to the base of the tank and an air supply tube 32. The outlet 30 is closed, e.g. by a bung 33 through which tubes 31 and 32 pass, to provide an airtight closure to the tank. The dip tube 31 passes to storage tank 10. The air tube 32 is connected to an air pump 34. Pump 34 is actuated by the timer switch 12 in response to signals from the level sensor in tank 10 and the conductivity cell 4. When reagent is required in tank 10, pump 34 is started. This pumps air into reservoir 6 which discharges reagent through the dip tube. Air is pumped into reservoir 6 for a given time thus displacing a given volume of reagent into tank 10. The pumping of reagent into tank 10 is repeated whenever the sensor in the tank is tripped until the level of reagent in reservoir 6 drops below the end of dip tube 31. This causes a drop in pressure in reservoir 6 which trips a low pressure switch 35 which puts pump 34 out of circuit. The low pressure switch 35 may also be used to actuate an alarm if low pressure is encountered in the initial pumping periods due to leaks. A high pressure switch 36 may be provided which is tripped at any time if pressure builds up due to a blockage in the system. It will be appreciated that fluctuations in pressure may occur during the initial stages of a pumping cycle and over-ride means may be provided whereby signals from the pressure switches are ignored during the first 5 seconds of each cycle. It is also necessary that the low pressure due to an empty reservoir be distinguished from the low pressure due to a leak. This is conveniently achieved by a timer mechanism which acts during the initial period, say first 20 to 120 seconds, of the resin regeneration cycle to trip an alarm if the low pressure switch is actuated.

Thus, in its simplest form the apparatus of the invention comprises one or more containers of water treatment materials, notably of cation exchange resin (1) and/or anion exchange resin (2), preferably having valved means (5), for passing water through the container(s); means (4) for monitoring the quality of water which has been treated in the container(s); one or more storage tanks (10 and 11) for a reagent to regenerate the material in the container(s) and in valved communication with the appropriate container(s) (1 and 2); pneumatic means (8 and 9) for supplying metered quantities of reagent to the appropriate storage tank (10 or 11), preferably this means comprises a substantially airtight vessel (6) adapted to receive a reagent and having an air inlet (32) connected to a pump means (34) and having a reagent outlet (3) having its orifice located internally adjacent the intended base of the vessel when in use and connected to the appropriate storage tank (10 or 11); means for supplying dilution water to each storage tank (10 or 11) in proportion to the amount of reagent fed thereto. Preferably the apparatus is provided with means for sensing when the liquid level in each storage tank drops to a given level; and interlocking control means whereby: (a) when the means (4) detects that the quality of the treated water is below the desired level, the flow of water to the containers (1 and 2) is halted and the storage tanks (10 and 11) are placed in fluid flow connection via the appropriate containers (1 or 2) to waste, (b) reagent and water are fed to the appropriate storage tanks (10 or 11) in the desired proportion and the tanks (10 and 11) are replenished with reagent and water when the level therein drops to the given level, and (c) when regeneration of the resins in the containers (1 and 2) has been carried out to the desired extent the containers (1 and 2) are placed in fluid flow communication with a supply of water. Preferably, there is provided a pressure sensor adapted to activate and/or deactivate the pump means in the pneumatic means, notably to detect when the pressure within the vessel drops to consumption of the contents of the vessel and thus when the available quantity of that reagent has been consumed.

The above form of apparatus may be modified in a number of ways. Thus, there may be provided safety interlinks whereby the supply of reagents is cut off if there is a blockage or leak in the system, although it may be desired to over-ride these safety interlinks during the initial stages of the regeneration cycle where delays in reaching operating pressures within the pipework may be experienced. The outlet to the apparatus may be fed directly to the site of use of the treated water, in which case it may be appropriate to maintain the apparatus at mains water pressure throughout. However, the apparatus will often be required to operate on an intermittent basis and it is desired that it is not maintained at mains pressure, but that valve 5 be shut off when the apparatus is not in use. In this case there may be a time lag between actuation of valve 5 and the supply of treated water from the outlet from the columns starting and stopping. To overcome this it is preferred to provide a tank 20 into which the treated water is fed. Tank 20 has a valved outlet 21 and a level sensor 22 linked to valve 5. On opening outlet 21, treated water in tank 20 is immediately available to the user. The water level in tank 20 drops, actuating level sensor 22. This opens valve 5 to pass water through columns 1 and 2 for treatment. The flow of water continues whilst water is being drawn via tank 20. When outlet 21 is shut, the level of water in tank 20 rises, tripping sensor 22 and shutting off valve 5. The residual outflow from columns 1 and 2 flows into tank 20 which is of suitable size to accomodate the water. In this way tank 20 is maintained in a 'topped up' condition after each use of the apparatus and can provide treated water during the initial start up period of the subsequent use. Where a pump 23, is present this can be used to recirculate water from tank 20 to columns 1 and 2 during periods when valve 5 is closed. This recirculation reduces the risk of bacterial growth in the stagnant water in the columns and tank 20 and can also be used as part of the rinse cycle as described above. Whilst the invention has been described above in respect of a device using both a cationic and an anionic resin column, it is within the scope of the present invention to use only one column and one reagent dispenser, e.g. in a water softening apparatus. Also the pneumatic means can discharge the whole of the contents of vessel (6) into the appropriate tank 10 or 11 in one continuous operation where tank 10 or 11 is of sufficient size to hold the whole of the required volume of diluted diluent.

Figure 2:
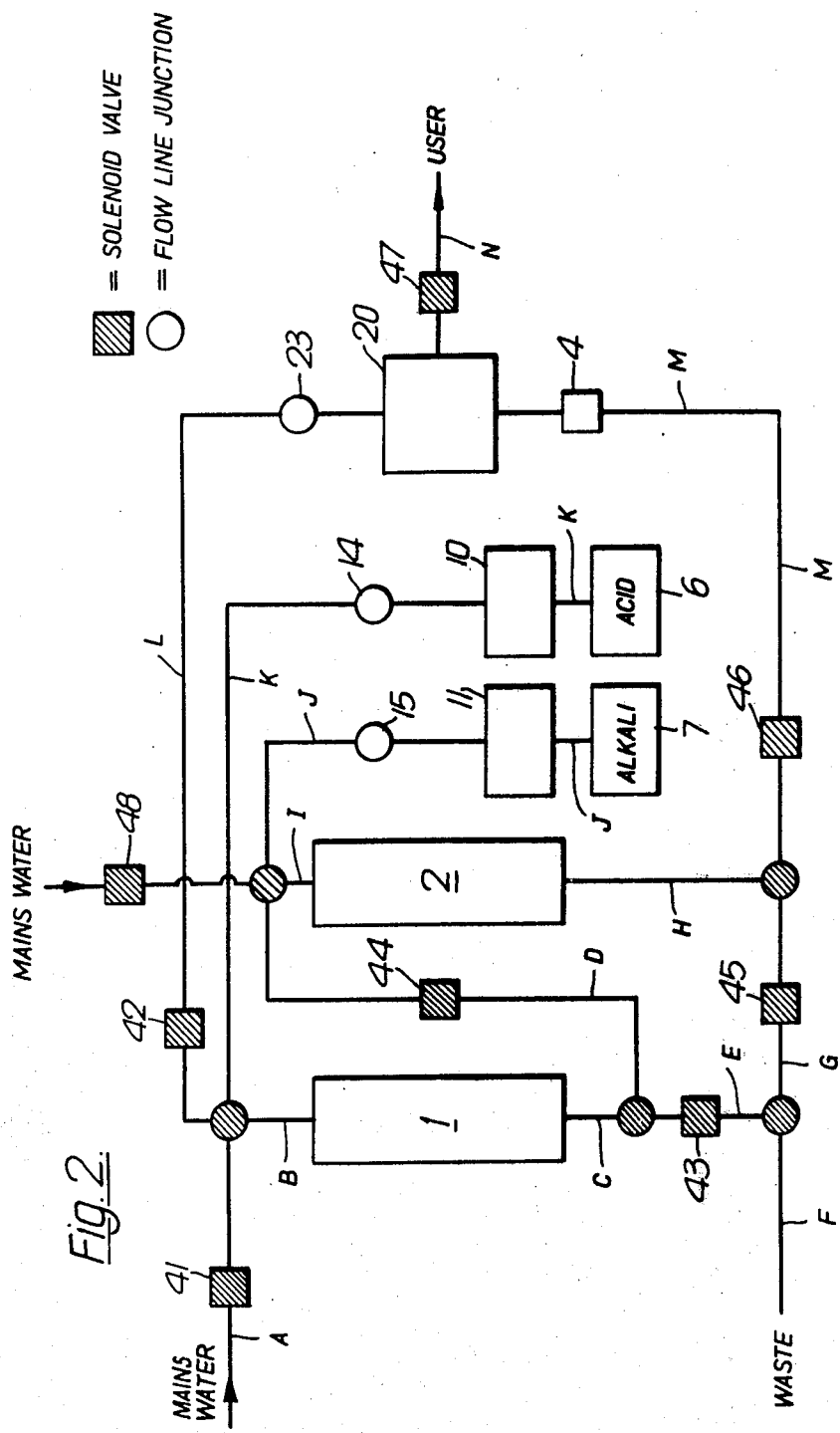
FIG. 2 is a flow chart of water and reagents through a simple form of the device of FIG. 1.

A schematic flow diagram of water and/or reagent through a simplified version of the device of FIG. 1 having only one cationic resin column and one anionic resin column is shown in FIG. 2. During the deionisation mode, water flows through the device of FIG. 2 as follows: A- valve 41 open -B- column 1-C-D- valve 44 open -I- column 2-H-M- valve 46 open -M- tank 20 - valve 47 open -N to user. When valve 47 is closed, valve 41 is also closed and recycle pump 23 is actuated to cycle water from tank 20 back to column 1 via line L and valve 42 and then through the above circuit. When the conductivity cell 4 detects that the water in line M is below the desired quality it initiates the regeneration cycle. In this, valve 41 is closed, acid flows via line K to tank 10 where it is diluted with water (from a supply not shown) and via pump or valve 14 to column 1 via lines K and B, then via line C, valve 43 and lines E and F to waste. Simultaneously, alkali flows via line J to tank 11 where it is diluted with water and fed via line J, pump or valve 15, line I, column 2, line H, valve 45, line G and line F to waste with the acid effluent. When the regeneration stage is completed (optionally with a wash of water through tanks 10 and 11) valves 41 and 48 open to admit rinse water. Valve 48 may be dispensed with if a water feed downstream of valve 41 is taken to line I. In the initial rinse, water flows in parallel via lines B and I to columns 1 and 2 and thence to waste via C, E, valve 43 and F and via H, valve 45, G and F respectively. In the second rinse stage valve 48 closes, valve 43 closes, valve 44 is open and water flows in series through columns 1 and 2 and to waste via H, valve 45, G and F. When the effluent reaches the required quality, valve 45 closes and valve 46 opens to pass the water to tank 20. If a third rinse stage is required valve 41 closes and the water fed to tank 20 is recirculated by pump 23 via line L, valve 42 and line B to column 1 until the conductivity sensor detects that the desired quality of water has been reached. The device then gives a signal that it is ready to dispense treated water via valve 47 and line N.

The invention also provides a method for treating water which comprises passing it in contact with one or more water treatment materials, e.g. an anionic and/or cationic resin, and monitoring the quantity of the treated water; generating a signal when the quality of the treated water falls below a given level to activate a process for regenerating the water treatment material(s) by causing regenerating reagent(s) to flow in contact with the water acid and/or alkali from a reservoir to flow through the resin(s) treatment material(s) characterised in that the reagent(s) are dispensed by pneumatic means from a storage reservoir, e.g. to a diluent tank where it is diluted with water and the diluted reagent is passed to the water treatment material(s).

The circuitry required to control the sequence of opening and shutting of valves and of operation of pumps and the like in the device of the invention is of conventional nature and may be readily constructed from commercially available components. A typical control circuitry for use with the device of FIG. 2 using pneumatic means for dispensing reagents from tanks 10 and 11 is shown diagrammatically in FIG. 4. In FIG. 4 the power lines are shown solid and the dotted lines indicate information transfer lines, usually whereby information is transmitted from a sensor or timer to a control circuit. Typically the control circuits comprise a series of relay switches whose settings are varied in accordance with the input from the appropriate sensors and timers. In FIG. 4 valves 41-48 have for convenience been indicated as valves 1-8 but the tanks and other items of the device of FIG. 2 are identified by the same numerals as in FIG. 2.

We claim:
1. An apparatus for the treatment of water which apparatus comprises at least one container of an ion exchange resin through which water is adapted to pass in contact with the resin; means for measuring the quality of water which has been treated in the container; at least one storage tank in valved communication with the container and for containing a reagent to regenerate the resin in the container; pneumatic means for supplying measured quantities of reagent from a reservoir to the storage tank; and means for supplying water to the storage tank in proportion to the amount of reagent fed thereto, so as to dilute the reagent in the storage tank; two different ion exchange resins in separate containers and a reagent supply means for each ion exchange resin; and wherein there is provided interlocking control means including: (a) first control means responsive to said means measuring the quality of the water detecting that the quality of the treated water is below the desired level, for stopping the flow of water to the containers and placing the storage tanks in fluid flow connection via the respective containers to waste to regenerate the respective ion exchange resins in the containers, (b) second control means for feeding reagent and water to the appropriate storage tanks (10 or 11) in the desired proportion and for replenishing the tanks (10 or 11) with reagent and water when the level therein drops to a given level, and (c) third control means actuable upon regeneration of the respective resin in the containers (1 and 2) to the desired extent, for placing the containers (1 and 2) in fluid flow communication with a supply of water to be treated.

2. An apparatus for the treatment of water which apparatus comprises at least one container of an ion exchange resin through which water is adapted to pass in contact with the resin; means for measuring the quality of water which has been treated in the container; at least one storage tank in valved communication with the container and for containing a reagent to regenerate the resin in the container; pneumatic means for supplying measured quantitites of reagent from a reservoir to the storage tank; and means for supplying water to the storage tank in proportion to the amount of reagent fed thereto, so as to dilute the reagent in the storage tank; a vessel adapted to receive the treated water, the vessel having a valved outlet and a level sensor adapted to close valve means on the water inlet when the level in the tank rises above a predetermined level; and pump means adapted to circulate treated water from the vessel to the said container.

3. A method for treating water which comprises passing it in contact with at least one ion exchange resin and measuring the quality of the treated water; generating a signal when the quality of the treated water falls below a given level, which signal activates a process for regenerating the ion exchange resin by causing regenerating reagent to flow in contact with ion exchange resin characterised in that the reagent is dispensed from a reagent reservoir by pneumatic means into a storage tank wherein it is diluted to the desired concentration for passage to the ion exchange resin; and wherein when substantially all of the contents of the reagent reservoir have been dispensed there is a loss of pressure in the reservoir and this loss of pressure is used to deactivate the pneumatic reagent dispensing means.

4. An apparatus for the treatment of water which apparatus comprises at least one container of an ion exchange resin through which water is adapted to pass in contact with the resin; means for measuring the quality of water which has been treated in the container; at least one storage tank in valved communication with the container and for containing a reagent to regenerate the resin in the container; pneumatic means for supplying measured quantities of reagent from a reservoir to the storage tank; and means for supplying water to the storage tank in proportion to the amount of reagent fed thereto, so as to dilute the reagent in the storage tank; the apparatus being provided with interlocking control means including: (a) first control means for stopping the flow of water to the container when said means measuring the quality of the water detects that the quality of the treated water is below the desired level, and for placing the storage tank in fluid flow connection via the container to waste to regenerate the ion exchange resin in the container, (b) second control means for feeding reagent and water to the storage tank in the desired proportion and for replenishing the tank with reagent and water when the level therein drops to a given level, and (c) third control means actuable upon regeneration of the resin in the container to the desired extent, and for placing the container in fluid flow communication with a supply of water to be treated.

5. Apparatus as claimed in claim 4 in which the pneumatic means comprises a substantially airtight vessel adapted to receive a reagent and having an air inlet connected to a pump means and having a reagent outlet having its orifice located internally adjacent the intended base of the vessel when in use and connected to the storage tank.

6. Apparatus as claimed in claim 4 wherein the pneumatic means is adapted to replenish the reagent in the storage tank when the diluted reagent has been discharged from the storage tank to the container.

7. Apparatus as claimed in claim 4 wherein there is provided a vessel adapted to receive treated water via a water inlet the vessel having a valved outlet and a level sensor adapted to close valve means on the water inlet when the level in the vessel rises above a predetermined level.

8. Apparatus as claimed in claim 7 wherein there is provided a pump means adapted to circulate treated water from the vessel to the said container.

* * * * *